United States Patent [19]
Olli et al.

[11] Patent Number: 5,766,764
[45] Date of Patent: Jun. 16, 1998

[54] NANOSCALE AMORPHOUS MAGNETIC METALS

[75] Inventors: Larry K. Olli, Seattle; Diane C. Rawlings, Bellevue; Robert J. Miller, Fall City, all of Wash.

[73] Assignee: The Boeing Company, Seattle, Wash.

[21] Appl. No.: 663,761

[22] Filed: Jun. 4, 1996

[51] Int. Cl.$^6$ ........................................... B32B 5/16
[52] U.S. Cl. .................. 428/407; 75/345; 75/348; 75/362; 148/105; 427/221; 428/694 BA; 428/900
[58] Field of Search ............................ 428/402, 694 BA, 428/328, 900, 407, 403; 427/221; 75/345, 348, 362; 148/105

[56] References Cited

U.S. PATENT DOCUMENTS 5,520,717  5/1996  Miller et al. ........................ 75/345

OTHER PUBLICATIONS

K. Suslick; "*Applications of Ultrasound to Materials Chemistry,*" MRS Bulletin; Apr., 1995; pp. 29–34.

J. Haggin; "*Nanostructured Catalysts Prepared,*" 209th ACS National Meeting; Apr. 24, 1995; p. 47.

K. Suslick et al.; "*Sonochemical Synthesis of Amorphous Iron,*" Nature, vol. 353; Oct. 3, 1991; pp. 414–416.

I. Billas et al.; "*Magnetism from the Atom to the Bulk in Iron, Cobalt, and Nickel Clusters,*" Science, vol. 265; Sep. 16, 1994; pp. 1682–1684.

C. Gibson et al.; "*Synthesis and Characterization of Anisometric Cobalt Nanoclusters;*" Science, vol. 267; Mar. 3, 1995; pp. 1338–1340.

L. Crum; "*Sonluminescence;*" Physics Today; Sep., 1994; pp. 22–29.

K. Suslick; "*The Chemistry of Ultrasound;*" Yearbook of Science and the Future; Encyclopedia Britannica, Inc., 1994; pp. 140–155.

K. Suslick; "*Sonochemistry;*" Am. Assoc. for the Adv. of Sci., vol. 247; pp. 1373–1520, Mar. 1990.

L. Crum; "*Sonoluminescence, Sonochemistry, and Sonophysics;*" J. Acoustical Soc. of Am.; vol. 95, No. 1, Jan. 1994, pp. 559–562.

*Primary Examiner*—H. Thi Le
*Attorney, Agent, or Firm*—John C. Hammar

[57] ABSTRACT

Sonochemistry permits extremely rapid cooling to form nanoscale amorphous metal particles. If magnetic, these particles are valuable for magnetic recording media, manufacture of permanent magnets, and other uses. The nanoscale particles agglomerate, however, which limits their utility for these magnetic applications. To keep the particles isolated, we extract the particles from the n-alkane reaction solvent in a polar solvent and cast the extracted particles with a polymer, such as polyvinylpyrrolidone.

16 Claims, No Drawings

NANOSCALE AMORPHOUS MAGNETIC METALS

REFERENCE TO RELATED APPLICATION

The present invention is related to U.S. Pat. No. 5,520,717 issued May 28, 1996.

1. Technical Field

The present invention relates to isolated nanoscale particles of amorphous magnetic metals which we make using sonochemistry to produce the particles, extraction to separate the particles from the reaction medium, and a polymer to prevent them from agglomerating during further processing.

2. Background Art

Kenneth Suslick of the University of Illinois pioneered research into sonochemistry, a technique that uses the energy of sound to produce cavitation bubbles in a solvent. The bubbles collapse during the compression portion of the acoustic cycle with extreme microscale energy release evidenced by high (microscale) localized temperatures and pressures, estimated at about 52000° F. and 1800 atm, respectively. Suslick determined that sonochemistry was an effective way to produce amorphous metal particles, and he developed laboratory processes for making amorphous iron agglomerates desired as catalysts in hydrocarbon reforming, carbon monoxide hydrogenation, and other reactions.

Suslick also discovered that he could produce metal colloids and supported catalysts if he sonicated the metal precursors (principally volatile metal carbonyls or other organometallics) with a suspended polymer like polyvinylpyrrolidone or with suspended inorganic oxide supports, such as silica or alumina.

Suslick's work focused on sonochemical techiques to form catalysts composed of agglomerated metal nanoparticles These catalysts are very efficient because of their large surface areas. His work is described in the following articles that we incorporate by reference:

(1) K. Suslick, "Sonochemistry," 247 Science 1439–1445 (23 Mar. 1990);

(2) K. Suslick et al., "Sonochemical Synthesis of Amorphous Iron", 353 Nature 414–416 (3 Oct. 1991);

(3) K. Suslick, "The Chemistry of Ultrasound," Yearbook of Science & the Future, Encyclopedia Britannica, Inc., 138–155 (1994); and (4) K. Suslick, "Applications of Ultrasound to Materials Chemistry," MRS Bulletin, Apr. 1995, pp. 29–34.

Similar work is described in the following articles by Lawrence Crum, that we incorporate by reference:

(1) L. Crum, "Sonoluminescence," Physics Today, Sep. 1994. pp. 22–29,and (2) L. Crum "Sonoluminescence, Sonochemistry, and Sonophysics", J. Acoust. Soc. Am. 95 (1), Jan. 1994, pp. 559–562.

Gibson discussed anisometric cobalt nanoclusters in his article in Science (vol. 267; Mar. 3, 1995), where he produced anisometric (hexagonal disk-shaped) cobalt nanoclusters about 100 nanometers in width and 15 nanometers in thickness with oriented (001) crystals comparable to cells of α-cobalt. Gibson sonicated $Co^{2+}$(aq) with hydrazine to produce the nanoclusters that were small enough to be strongly influenced by Brownian forces and thereby resistant to agglomeration. Working with hydrazine, however, on a commercial scale poses considerable safety questions.

SUMMARY OF THE INVENTION

The present invention relates to isolated nanoscale, amorphous, magnetic metal particles made using sonochemistry to produce the particles, extraction to separate them from the reaction medium, and a monomer or polymer to isolate them. The particles can be used for magnetic recording media and other applications where agglomerated particles have reduced value.

In the present invention, we create nanoscale amorphous metal particles using Suslick's sonochemistry techniques using organometallic precursors like iron pentacarbonyl ($Fe(CO)_5$) in an alkane (like n-heptane or n-decane) under an inert atmosphere. Our sonic energy is input at about 20 kHz and 40–100 Watts for 0.1–24 hours. Thereafter, we extract the particles (about 5–30 nm diameter) from the alkane using a polar solvent of reasonably high vapor pressure such as ethylene glycol monomethyl ether ($CH_3O$—$CH_2CH_2$—OH). Then, we add a polymer or polymeric precursors (especially those of vinylpyrrolidone, an acrylic, or a urethane) with or without surfactants to coat and separate the metal particles.

DETAILED DESCRIPTION OF A PREFERRED EMBODIMENT

By "nanoscale," we mean particles (typically spheres) of no more than about 50–100 nanometers (nm) in diameter. Generally, the particles size distribution is in the range of 5–100 nm; typically, 5–50 nm; and, usually, 5–30 nm.

The present invention improves on the sonochemistry process of forming nanoscale, magnetic, amorphous, metal particles by providing a simple and safe method for isolating the particles from organometallic precursors, like $Fe(CO)_5$, without agglomeration. These particles are useful in magnetic recording media and other coatings responsive to incident radiation. Particle size and density are important in these applications. Agglomeration increases the effective particle size and decreases the particle density, making them less effective. A process that prevents agglomeration by isolating the particles made with the sonochemistry process provides the best quality product for our intended applications.

We add the iron carbonyl or another suitable organometallic precursor or a mixture of these organometallics to a reaction flask under an inert (argon) environment with the reaction typically being carried out with neat metal carbonyl (as we describe in greater detail in U.S. patent application Ser. No. 08/657,992 entitled "Continuous Process for Making Nanoscale Amorphous Magnetic Metals") or as a hydrocarbon solution, particularly an alkane, like n-heptane or n-decane. The hydrocarbon should have a reasonably high boiling point and should be inert with the organometallics. Suitable alkanes are straight and branched chain $C_6$–$C_{12}$ or possibly higher. Alternatively the reaction may be carried out in water stabilized with hydrazine. Generally we follow the process descriptions of Suslick and Gibson in other respects, inputting sonic energy to the reaction mixture at about 20 kHz and 40–100 Watts for 0.1–24 hours.

After making the nanoscale particles, which are essentially all spherical metal particles of about 5–30 nm diameter we depart from the prior art by extracting these particles from the reaction mixture so that we can isolate them and keep them from agglomerating in further processing.

We have discovered that the particles have a high affinity for a polar solvent, while the unreacted organometallic precursors, especially $Fe(CO)_5$, are essentially immiscible in the polar solvent. When we use heptane as the carrier solvent in the reaction mixture, we use the commercially available solvent ethylene glycol monomethyl ether ($CH_3O$—$CH_2$—$CH_2$—OH), which is essentially immiscible in the heptane so that the extraction is quick. For the extraction, we generally use about equal volumes of the reaction mixture and the extraction solvent. We obtain essentially complete recovery of the particles in the extraction solvent and leave essentially all of the organometallic precursors in the reaction mixture.

While we have not done complete analysis of other suitable polar solvents, we believe that other alkoxyalkyl alcohols or aliphatic polyols, such as ethylene glycol, would be suitable extraction solvents. We seek a nontoxic, nonhazardous solvent that has a relatively high boiling point. We believe that NMP (N-methyl-2-pyrrolidone) and the alkylene carbonates, or mixtures thereof should work.

Once in the extraction solvent, we add surfactants, monomers, organic matrix resins, or mixtures thereof, especially urethanes, to both thicken the solution and, ultimately, to coat the particles. Both mechanisms work to keep the particles electrically isolated and prevent them from agglomerating. We do not wish to be limited to either or both mechanism, however, to explain the function and character of the organic matrix resin.

The resin can be thermoplastic or thermosetting. We can add polyvinylpyrrolidone (or its precursors), polyimides, polycarbonate, methylmethacrylate, an acrylic, or polyesters.

Typical resins in the cyanate family (i.e., the urethanes) are described in U.S. Pat. No. 5,134,421, which we incorporate by reference. Cyanate resins are characterized by the reactive functionality —OCN, but we use the term to include the thio cyanate cousins —SCN as well. Cyanate resins are prepared by reacting diols or polyols with a cyanogen halide, especially cyanogen chloride or bromide. The synthesis is well known and is described in U.S. Pat. Nos. 3,448,079; 3,553,244; and 3,740,348, for example; each of which we incorporate by reference. The cyanate functionality self-polymerizes to form cyanate esters either with or without a suitable catalyst (such as tin octoate). If the solvent is already a diol, we can make the cyanate resin simply by adding cyanogen halide to produce a urethane in which the nanophase particles are dispersed.

We might also use linear cyanate oligomers described in U. S. patent application Ser. No. 08/327,942, which we incorporate by reference. Such oligomers have one, two, or four reactive functionalities (like maleic or nadic) at each end of the polymer chain for crosslinking upon curing. In these oligomers, we convert diols to dicyanates (i.e., N≡C—O—R$_4$—O—C≡N, where R$_4$ is the residue of an organic diol) in the presence of cyanogen halide and connect phenol end cap monomers or corresponding cyanate end cap monomers using the same reaction.

Suitable catalysts for the cyanate resin systems of the subject invention are well known to those skilled in the art, and include the various transition metal carboxylates and naphthenates, for example zinc octoate, tin octoate, dibutyltindilaurate, cobalt naphthenate, and the like; tertiary amines such as benzyldimethylamine and N-methylmorpholine; imidazoles such as 2-methylimidazole; acetylacetonates such as iron (III) acetylacetonate; organic peroxides such as dicumylperoxide and benzoylperoxide; free radical generators such as azobisisobutyronitrile; organophoshines and organophosphonium salts such as hexyldiphenylphosphine, triphenylphosphine, trioctylphosphine, ethyltriphenylphosphonium iodide and ethyltriphenylphosphonium bromide; and metal complexes such as copper bis[8-hydroxyquinolate]. Combinations of these and other catalysts may also be used.

Virtually any diol can be converted to the cyanate analog and used in this synthesis. For high MWs, however, we prefer to use a soluble dicyanate, especially:

NCO-Ø-O-Ø-SO$_2$-Ø-O-Ø-OCN.

The thiocyanates exhibit essentially the same chemistry.

We thicken the resin solution by evaporating a large portion of the extraction solvent. The product is a powder, film, paint (or varnish), or paste useful for making magnetic media and other products where small particles are beneficial.

While we have described preferred embodiments, those skilled in the art will recognize modifications, alternatives, or variations that might be made without departing from the inventive concept. Therefore, limit the claims only as necessary in view of the pertinent prior art.

We claim:

1. A composition having nanoscale, individually-isolated, metal particles, made by the process comprising the steps of:

(a) sonicating a mixture of a metal carbonyl in an n-alkane solvent to produce an amorphous metal in the form of nanoscale particles;

(b) extracting the metal particles from the n-alkane in an immiscible polar solvent;

(c) adding a polymer or polymeric precursors to the polar solvent-metal mixture to isolate the metal particles, thereby forming a polymer-metal mixture; and (d) separating the polymer-metal mixture from the polar solvent.

2. The composition of claim 1 wherein the metal carbonyl is Fe(CO)$_5$.

3. The composition of claim 1 wherein the n-alkane is heptane or decane.

4. The composition of claim 1 wherein the polar solvent is ethylene glycol monomethyl ether.

5. The composition of claim 1 wherein the polymer is polyvinylpyrrolidone.

6. The composition of claim 1 wherein the polymer is an acrylic.

7. The composition of claim 1 wherein the polymer is a urethane.

8. The composition of claim 1 wherein the metal carbonyl is Fe(CO)$_5$, the n-alkane solvent is heptane or decane, the polar solvent is CH$_3$O—CH$_2$—CH$_2$—OH, the polymer is selected from the group consisting of polyvinylpyrrolidone, acrylic, and urethane, and the sonicating step involves 20 kHz at 40–100 Watts for 0.1–24 hours in an inert atmosphere.

9. The composition of claim 1 wherein the nanophase particles have diameters less than 100 nm.

10. The composition of claim 1 wherein the nanophase particles have diameters of about 5–100 nm.

11. The composition of claim 1 wherein sonicating involves inputting sound energy at 20 kHz at 40–100 W for 0.1–24 hours.

12. The composition of claim 11 wherein the polymer is urethane and wherein the nanoscale particles have diameter of about 5–100 nm.

13. The composition of claim 12 wherein the metal carbonyl is Fe(CO)$_5$.

14. Nanoscale, individually-isolated, amorphous, spherical, magnetic metal particles having diameters less than 100 nm carried in and separated one from another by a polymer.

15. The particles of claim 14 formed by sonicating Fe(CO)$_5$.

16. The particles of claim 15 wherein the polymer is urethane.

* * * * *